United States Patent
Broberg

(10) Patent No.: US 6,286,245 B1
(45) Date of Patent: Sep. 11, 2001

(54) TAG LINE RETURN

(76) Inventor: James E. Broberg, 2819 Oak Ridge Rd., Crystal Lake, IL (US) 60012

( * ) Notice: Subject to any disclaimer, the term of this patent is extended or adjusted under 35 U.S.C. 154(b) by 0 days.

(21) Appl. No.: 09/426,871

(22) Filed: Oct. 26, 1999

(51) Int. Cl.[7] .................. A01K 91/08; A01K 91/053
(52) U.S. Cl. ............................................. 43/27.4; 254/394
(58) Field of Search .................. 43/27.4, 43.13; 114/253; 242/615.1, 2.3; 254/394, 402

(56) References Cited

U.S. PATENT DOCUMENTS

| | | | |
|---|---|---|---|
| 1,896,415 | * | 2/1933 | Pyles .................... 254/394 |
| 2,516,383 | * | 7/1950 | Hays .................... 254/394 |
| 2,535,428 | * | 12/1950 | Kubiak .................. 254/394 |
| 3,012,756 | * | 12/1961 | Cronkright ............. 254/402 |
| 3,626,627 | * | 12/1971 | Osborne ................. 43/27.4 |
| 3,839,813 | * | 10/1974 | DeSmidt et al. ........ 43/43.13 |
| 4,069,611 | * | 1/1978 | Dusich et al. .......... 43/43.12 |
| 4,248,002 | * | 2/1981 | McNellis ................ 43/27.4 |
| 4,492,363 | * | 1/1985 | Niskin .................. 254/394 |
| 4,610,409 | * | 9/1986 | Emory, Jr. ............. 43/27.4 |
| 4,644,678 | * | 2/1987 | Seres ................... 43/27.4 |
| 4,682,634 | * | 7/1987 | Palau et al. ........... 254/394 |
| 4,807,386 | * | 2/1989 | Emory, Jr. ............. 43/27.4 |
| 4,907,347 | * | 3/1990 | Pease ................... 43/27.4 |
| 4,920,680 | * | 5/1990 | Lindgren ............... 43/27.4 |
| 5,149,059 | * | 9/1992 | Monahan ................ 254/394 |

FOREIGN PATENT DOCUMENTS

1319386 * 6/1973 (GB) ...................... 43/27.4

* cited by examiner

Primary Examiner—Darren W. Ark
(74) Attorney, Agent, or Firm—Niro, Scavone, Haller & Niro

(57) ABSTRACT

A tag line return that repositions a tag line to the base of an outrigger after release of a fishing line from the tag line. The return has a housing with internal guides which are adapted to urge the return upwardly when a fishing line is attached to the tag line and to slide downwardly when the fishing line is released.

5 Claims, 2 Drawing Sheets

TAG LINE RETURN

BACKGROUND OF THE INVENTION

The present invention is an outrigger line return which is used to return a tag line to the base of an outrigger pole used on a fishing boat. More specifically, the present invention is an outrigger return that uses a series of guides that automatically return a tag line to the base of the outrigger once the fishing line is released.

SUMMARY OF THE INVENTION

DESCRIPTION OF THE PREFERRED EMBODIMENT

Figure 1:
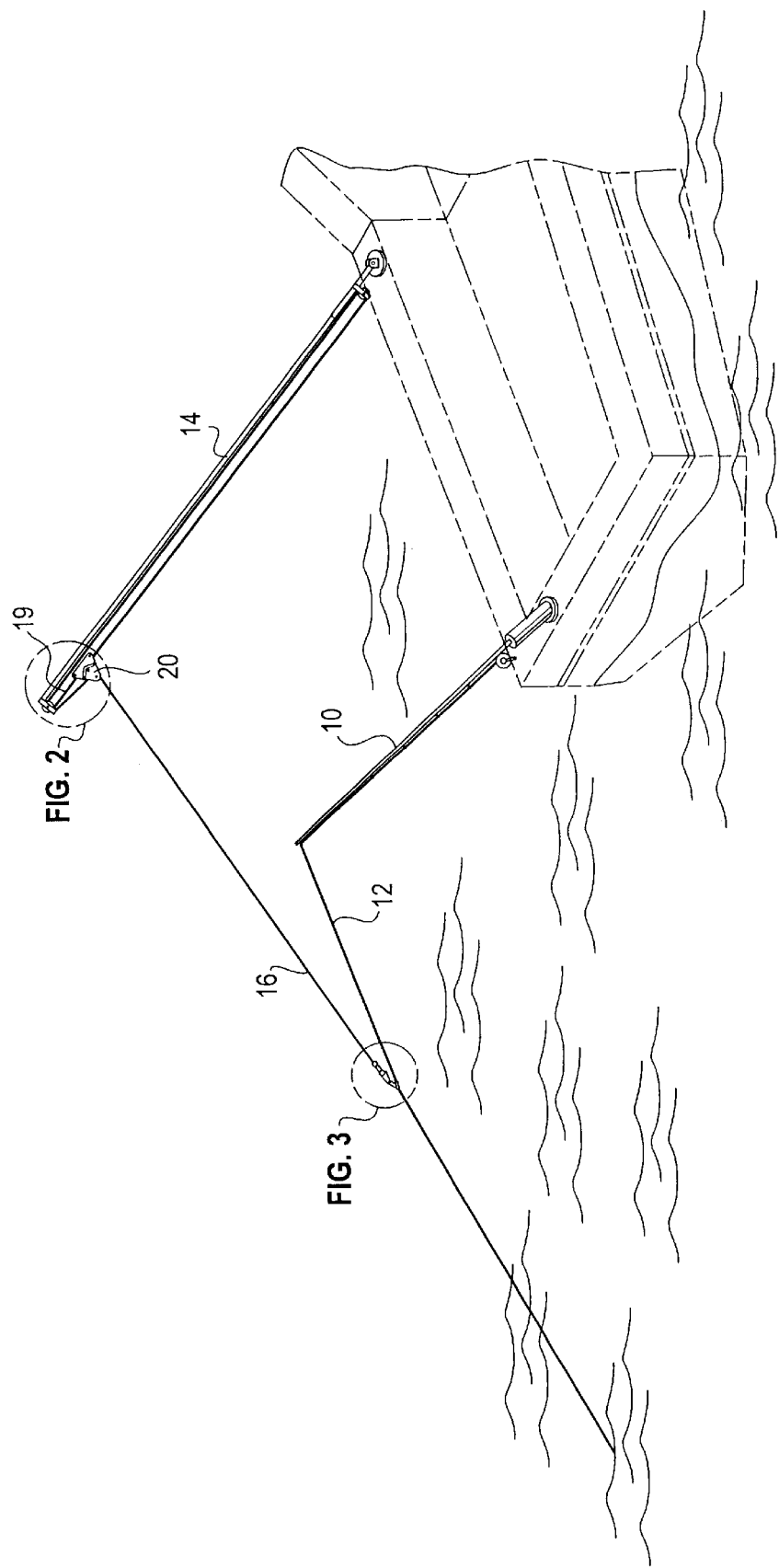
FIG. 1 is a perspective view of the present invention connected to an outrigger.
Figure 2:
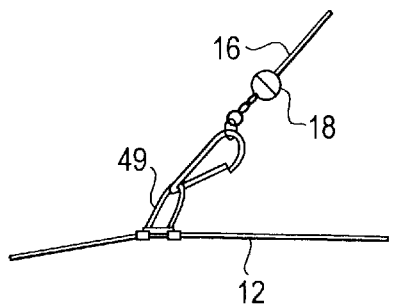
FIG. 2 is an exploded perspective view of the embodiment shown in FIG. 1.
Figure 3:
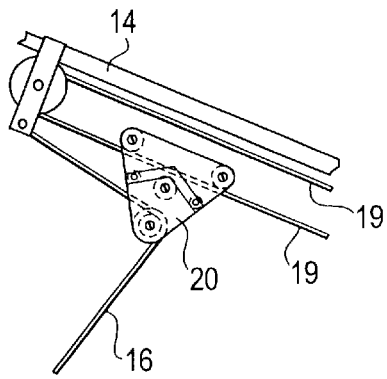
FIG. 3 is an exploded view showing how a fishing line is connected to a tag line.

FIG. 1 shows a fishing pole 10, fishing line 12, outrigger 14, outrigger line 19, tag line 16, and a catch 18 located at the end of line 16. A rubber band 49 holds fishing line 12 to tag line 16.

A tag line return 20 is also provided. Return 20 is made of first plate 22 and opposingly located second plate 24. Located in between plates 22 and 24 are linearly aligned interior rollers 25 and 26, middle roller 28, and outer roller 27, which act as line guides.

Plate 22 also includes a V-shaped notch 30. Located in notch 30 are line retainers 32 and 34 which may be made of rubber.

Figure 4:
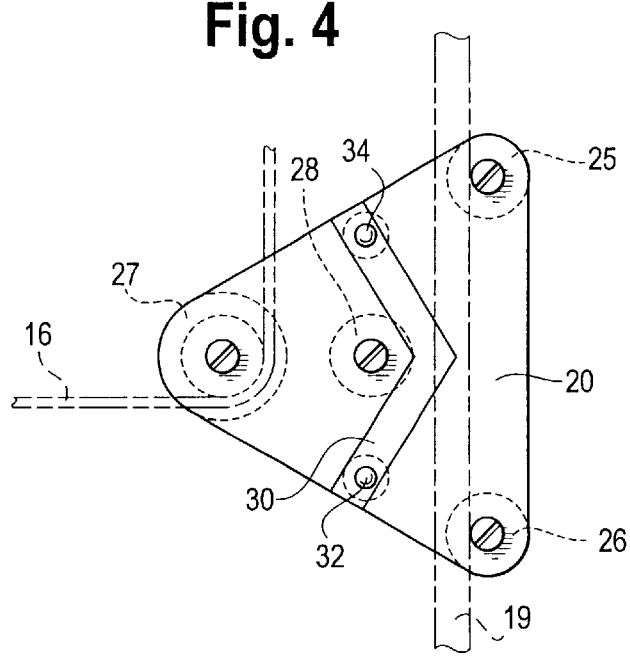
FIG. 4 is a top view of the tag line return.
Figure 5:
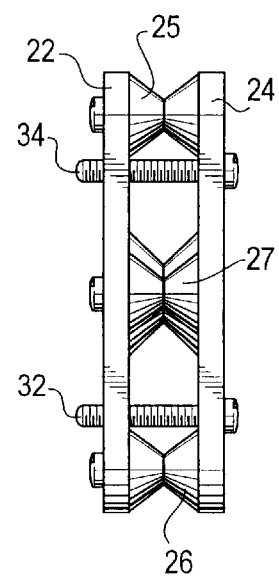
FIG. 5 is a side view of the device shown in FIG. 4.
Figure 6:
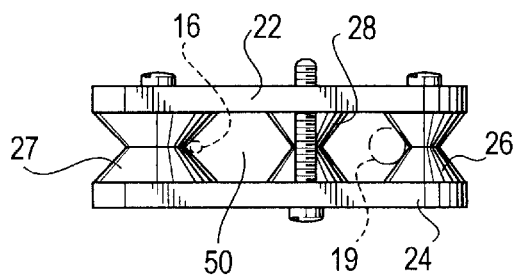
FIG. 6 is a top view of the embodiment shown in FIG. 4.

In use, the part of outrigger line 19 that parallels the outrigger is first inserted into groove 30 and is placed between guides 25 and 26, which are linearly aligned, and guide 28. Because stops or retainers 32 and 34 are made of rubber, they deform during the insertion of line 16 to permit the line to be placed between the plates and they also act to retain the line in-between the plates. In addition, the V-shape of the notch assists in retaining line 16 in the return device. As shown in FIG. 4, the distal ends 36 and 38 of notch 30 are located at a point beyond guide 28. Thus, when the line is under tension and in a straight line, even when line 19 is abutted against guide 28, it's straight shape will not match the V-shape of groove 30 so as to prevent disengagement.

Next, after return 20 is placed between the opposing ends of the outrigger on line 19, the distal end of line 16 is placed through in the housing between guides 27 and 28 by the aperture 50 formed. Once line 16 is affixed to fishing line 12 by a release such as a rubber band 49, the tension created by the fishing line will act on guide 27 and pull return device 20 upward along the outrigger pole. The linear configuration of guides 25 and 26 permits the smooth travel of return 20 along the length of the outrigger. Once fishing line 12 is released, the weight of the device causes the device to drop to the base of the outrigger, and thus, return the distal end of line 16 to the base as well. In this location, a fishing line 12 may be reattached to line 16.

The components of the device such as plates 22 and 24 and the guides may be made of stainless steel, plastic, or other materials known to those of skill in the art.

It should be understood that various changes and modifications to the preferred embodiments described would be apparent to those skilled in the art. Changes and modifications can be made without departing from the spirit and scope of the present invention and without diminishing its intended advantages. It is, therefore, intended that such changes and modifications be covered by the following claims.

What is claimed is:

1. A tag return for repositioning a tag line to a base of an outrigger, having an outrigger line, after the release of a fishing line comprising:

a housing having opposing support walls;

a middle, outer, and at least one inner line guides opposingly located and disposed between said support walls;

an opening on one of said walls, said opening configured to permit the insertion of said outrigger line into a retainingly held position between said at least one inner and middle guides;

said middle guide and said outer guide spaced apart to create an aperture for receiving said tag line; and said outer guide adapted to urge said return upwardly when said fishing line is engaged to said tag line and said at least one inner and middle guides are adapted to permit said return to slide downward to return said tag line to the base of the outrigger when said fishing line is disengaged from said tag line.

2. The tag return of claim 1 wherein said opening is V-shaped.

3. The tag return of claim 2 wherein an apex of said V-shaped opening is pointed away from said outer guide.

4. The tag return of claim 1 wherein the at least one inner guide comprises two inner guides which are linearly aligned.

5. The tag return of claim 1 further including flexible stops in said opening which prevent said outrigger line from passing through said opening after said outrigger line is inserted in between said walls.

* * * * *